(12) United States Patent
Bigus et al.

(10) Patent No.: US 8,214,364 B2
(45) Date of Patent: Jul. 3, 2012

(54) MODELING USER ACCESS TO COMPUTER RESOURCES

(75) Inventors: Joseph P. Bigus, Hilton Head Island, SC (US); Leon Gong, Austin, TX (US); Christoph Lingenfelder, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 12/124,274

(22) Filed: May 21, 2008

(65) Prior Publication Data

US 2009/0292743 A1    Nov. 26, 2009

(51) Int. Cl.
*G06F 17/30* (2006.01)

(52) U.S. Cl. .......................... 707/737; 707/784; 726/22

(58) Field of Classification Search .................. None
See application file for complete search history.

(56) References Cited

U.S. PATENT DOCUMENTS

| | | | |
|---|---|---|---|
| 5,557,742 A | 9/1996 | Smaha et al. | |
| 5,704,012 A | 12/1997 | Bigus | |
| 5,745,652 A | 4/1998 | Bigus | |
| 6,223,281 B1 | 4/2001 | Bird et al. | |
| 6,334,121 B1 * | 12/2001 | Primeaux et al. | 706/62 |
| 6,347,374 B1 | 2/2002 | Drake et al. | |
| 6,405,318 B1 | 6/2002 | Rowland | |
| 6,549,208 B2 | 4/2003 | Maloney et al. | |
| 6,981,040 B1 * | 12/2005 | Konig et al. | 709/224 |
| 7,024,431 B1 * | 4/2006 | Kornelson et al. | 1/1 |
| 7,333,998 B2 * | 2/2008 | Heckerman et al. | 1/1 |
| 7,721,336 B1 | 5/2010 | Adjaoute | |
| 2005/0203881 A1 * | 9/2005 | Sakamoto et al. | 707/3 |
| 2006/0282660 A1 | 12/2006 | Varghese et al. | |
| 2007/0039049 A1 * | 2/2007 | Kupferman et al. | 726/22 |
| 2007/0220604 A1 * | 9/2007 | Long | 726/22 |
| 2008/0027924 A1 * | 1/2008 | Hamilton et al. | 707/5 |
| 2009/0293121 A1 | 11/2009 | Bigus et al. | |

* cited by examiner

*Primary Examiner* — Tim T Vo
*Assistant Examiner* — Michelle Owyang
(74) *Attorney, Agent, or Firm* — Patterson & Sheridan LLP (57) ABSTRACT

Embodiments of the invention provide a method for detecting changes in behavior of authorized users of computer resources and reporting the detected changes to the relevant individuals. The method includes evaluating actions performed by each user against user behavioral models and business rules. As a result of the analysis, a subset of users may be identified and reported as having unusual or suspicious behavior. In response, the management may provide feedback indicating that the user behavior is due to the normal expected business needs or that the behavior warrants further review. The management feedback is available for use by machine learning algorithms to improve the analysis of user actions over time. Consequently, investigation of user actions regarding computer resources is facilitated and data loss is prevented more efficiently relative to the prior art approaches with only minimal disruption to the ongoing business processes.

24 Claims, 10 Drawing Sheets

MODELING USER ACCESS TO COMPUTER RESOURCES

BACKGROUND OF THE INVENTION

1. Field of the Invention

The present invention generally relates to data loss prevention and, in particular, to mitigating risks of misappropriation of data by authorized users of computer information systems.

2. Description of the Related Art

From the earliest application of digital computer systems to business data processing there has been a need to protect the data stored in a computer system. Despite the best current efforts, data loss still occurs and, in many cases, is perpetrated not by hackers or unauthorized entry into a computer system, but by authorized "trusted" users of the system. Recognizing this vulnerability has led to the formation of a field called data loss protection or data loss prevention where a variety of techniques are used to monitor and detect the misappropriation of sensitive data.

For example, in the case of computer source code, one common technique to reduce misappropriation of the code is to partition a system so that any individual user may only see a fraction of the entire code base. Source code management (SCM) systems, which are typically used to store and perform change management over large source code repositories, provide a variety of mechanisms to enable partitioning. For example, the IBM Rational ClearCase system allows a single code base to be divided across multiple versioned object bases (VOBs), with each VOB having discrete and disjoint sets of users. Another source code management system, the Configuration Management Version Control (CMVC) system developed and used by IBM software development, allows partitioning a product into discrete components, each with their own discrete sets of users and access permissions. While a user could gain access to a portion of the source code for the software system and misappropriate the code by copying it to a removable hard drive, USB thumb drive, CD-ROM drive, or via an e-mail to a third party, the idea is that, due to the partitioning of the source code, the devious user cannot reproduce the entire product. Especially sensitive source code containing key algorithm implementations could be further partitioned to impose even more strict limitations regarding access to the code.

While partitioning of valuable intellectual property is a well-known method for reducing data loss, there is still a need for improved monitoring of the actions and behavior of authorized users to computer resources such as computer source code.

SUMMARY OF THE INVENTION

One embodiment provides a method for modeling user access to computer resources. The method may generally include collecting a first set of log records documenting user actions in accessing the computer resources during a first time interval, aggregating the first set of log records at one or more chronological levels, and selecting one or more model types. Each model type is used to evaluate the first set of log records. The method may further include selecting one or more attributes from the first set of log records, aggregating data associated with the one or more selected attributes into one or more mining tables according to the one or more levels, and selecting algorithm parameters for the selected one or more model types. The method may further include creating the one or more models of user behavior by running the selected one or more model types using the aggregated data in the one or more mining tables and the selected algorithm parameters, where each model of user behavior characterizes an expected pattern for accessing the computer resources.

Another embodiment of the invention includes a computer-readable storage medium storing a computer program which, when executed by a processor, performs operations. The operations may generally include collecting a first set of log records documenting user actions in accessing the computer resources during a first time interval, aggregating the first set of log records at one or more chronological levels, and selecting one or more model types. Each model type is used to evaluate the first set of log records. The operations may further include selecting one or more attributes from the first set of log records, aggregating data associated with the one or more selected attributes into one or more mining tables according to the one or more levels, and selecting algorithm parameters for the selected one or more model types. The operations may further include creating the one or more models of user behavior by running the selected one or more model types using the aggregated data in the one or more mining tables and the selected algorithm parameters, where each model of user behavior characterizes an expected pattern for accessing the computer resources.

Still another embodiment of the invention includes a system having a processor and a memory containing a program, which when executed by the processor is configured to monitor the activity of users in accessing computer resources by performing an operation. The operation may generally include collecting a first set of log records documenting user actions in accessing the computer resources during a first time interval, aggregating the first set of log records at one or more chronological levels, and selecting one or more model types. Each model type is used to evaluate the first set of log records. The operation may further include selecting one or more attributes from the first set of log records, aggregating data associated with the one or more selected attributes into one or more mining tables according to the one or more levels, and selecting algorithm parameters for the selected one or more model types. The operation may also include creating the one or more models of user behavior by running the selected one or more model types using the aggregated data in the one or more mining tables and the selected algorithm parameters, where each model of user behavior characterizes an expected pattern for accessing the computer resources.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present invention generally provide a method, apparatus and computer-readable medium for detecting changes in the behavior of authorized users of computer systems and reporting the detected changes. Additionally, embodiments of the invention are descried herein relative to an example of a source code management (SCM) tool. Of course, the source code tool is just one example of computer resources being protected using an embodiment of the invention, and embodiments of the invention may be adapted for use with any number of resources accessed by users of a computer system. As described herein, the method of detecting changes in the behavior of authorized users is based on a SCM system that provides coordination of and support services to members of a software development team. One service provided by the SCM system includes logging user actions to a text log file for tracing the actions of users over time. Each log file typically contains a time stamp, a user identifier, an action code, and additional data which may depend on the action.

Embodiments of the present invention provides for processing the log files by parsing the log files into their constituent individual log records and loading the individual log records into a staging database and then into a data warehouse. The individual log records are then aggregated and processed using data mining algorithms to create user behavioral models. Once the user behavioral models are created, subsequent log files are used to "score" or evaluate the series of actions taken by a user to detect whether the actions are consistent with or deviate from the expected actions based on the past behavior exhibited by the user or users of a similar role. Employing a combination of user behavioral models and business rules, a subset of the users may be identified as having suspicious or unexpected behaviors. Data from the log files for such users is then processed into specialized management reports and made available to the management, e.g., at a secure web site. For each selected user, an e-mail alert is generated and automatically sent to a manager who may then access the reports via a Universal Resource Link (URL) embedded in the alert email. The manager may view the customized reports and graphics, and provide feedback via a web form indicating whether the user behavior was due to the normal expected business needs, to temporary business needs, or whether the behavior is unexpected and warrants further review and possibly management action. The management response data is then added to the database and used to avoid duplicate alerts from being generated. In addition, the management response data is also available for use by machine learning algorithms to improve the scoring process over time.

With such an approach, user actions regarding computer resources may be investigated with only a minimal disruption to the ongoing software development processes. In addition, abrupt changes in behavior that may indicate use of an account by another user (i.e. a stolen password) may be detected. As a result, a data loss prevention method is available that is more effective relative to the prior art approaches.

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to and from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

System Overview

Figure 1:
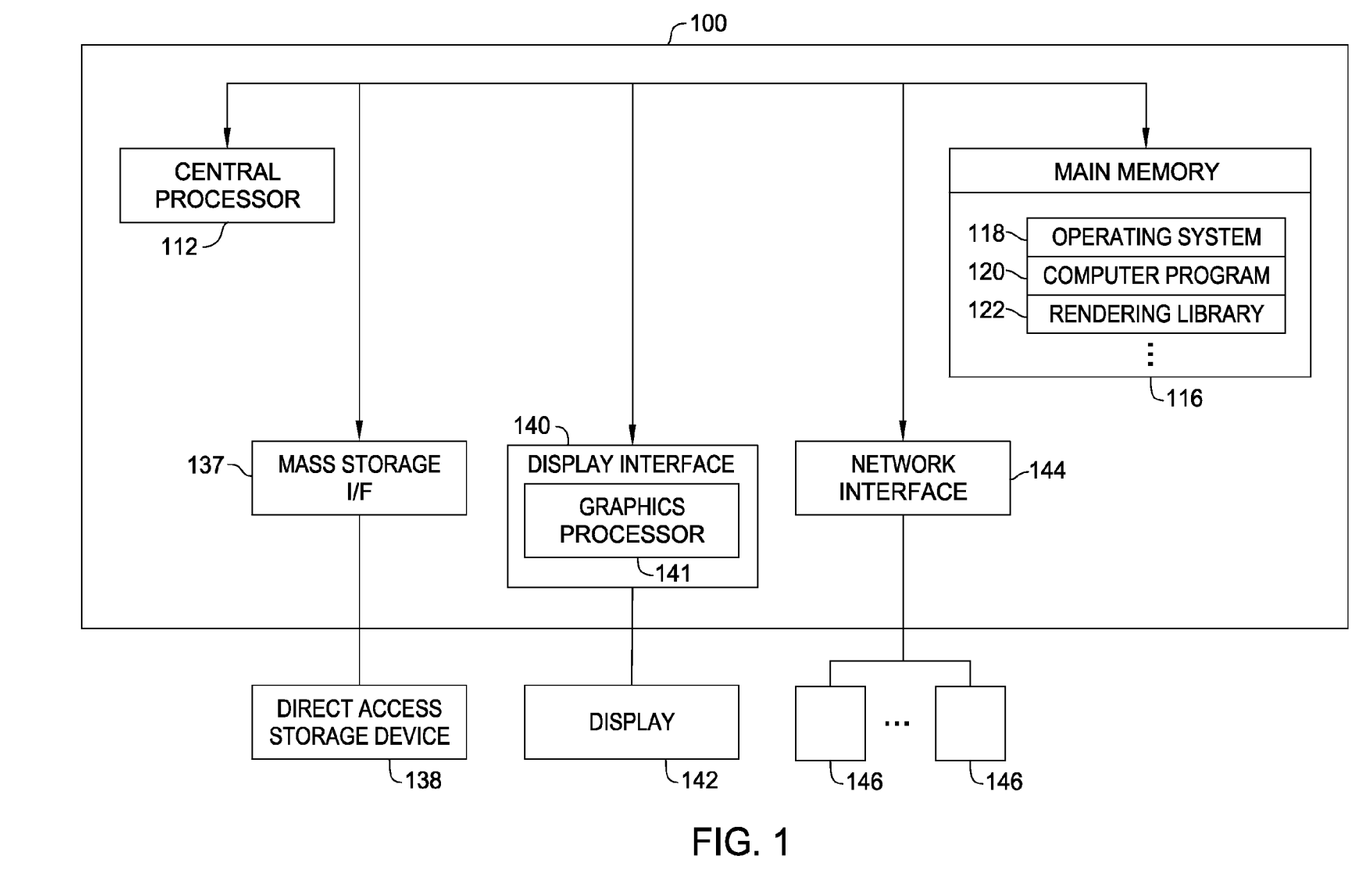
FIG. 1 illustrates a computer system, according to one embodiment of the present invention.

FIG. 1 illustrates a particular system for implementing the present embodiments. However, those skilled in the art will appreciate that embodiments may be practiced with any variety of computer system configurations including hand-held devices, multiprocessor systems, microprocessor-based or programmable consumer electronics, minicomputers, mainframe computers and the like. Embodiments may also be practiced in distributed computing environments where tasks are performed by remote processing devices linked through a communications network. In a distributed computing environment, program modules may be located in both local and remote memory storage devices.

In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

FIG. 1 illustrates a computer system 100, according to one embodiment of the present invention. The computer system 100 may be a standalone device or networked into a larger system. In one embodiment, the computer system 100 may be representative of existing computer systems, e.g., desktop computers, server computers, laptop computers, tablet computers, and the like. The computing environment illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, computer system 100 includes a central processing unit (CPU) 112, which obtains instructions and data from storage 137 and memory 116. CPU 112 is a programmable logic device that performs all the instruction, logic, and mathematical processing in a computer. Storage 137 stores application programs and data for use by computer system 100. Storage 137 may include hard-disk drives, flash memory devices, optical media and the like. Storage space may also be provided by external storage devices as well as storage volumes mounted over a network (e.g., storage device 138).

Computer system 100 may be connected to a network including network devices 146 via network interface 144. The network itself may be both local and/or wide area networks, including the Internet. Memory 116 may include an operating system for managing the operation of the computer system 100. Well known examples of an operating system includes include UNIX, a version of the Microsoft Windows® operating system, and distributions of the Linux® operating system. (Note, Linux is a trademark of Linus Torvalds in the United States and other countries.)

As shown, main memory 116 includes the operating system 118, a computer program 120, and a rendering library 122 which may be used to render graphics and perform other calculations for the computer program 120.

The computer system 100 may also include a display interface 140 operably connected to a display 142. The display interface 140 may include a graphics processor 141. The display 142 may be any video output device for outputting a user interface.

Detecting Changes in User Behavior and Generating Alerts

Embodiments of the present invention provide a method and computer-readable medium for detecting changes in behavior of authorized users of computer systems and reporting changes in behavior deemed to be problematic. As described below, embodiments may evaluate actions performed by a user against user behavioral models and business rules. In one embodiment, by such detecting changes, a subset of users may be identified and reported as engaging in suspicious or unexpected behaviors. As a result, user actions regarding computer resources may be investigated and data loss may be prevented more efficiently relative to the prior art approaches with only a minimal disruption to the ongoing business processes.

In one embodiment, detecting changes in user behavior and generating alerts using the described method may be used by programs (e.g., program 120 and/or rendering library 122) in which preventing data loss is desired. Results of the described method may then be displayed, e.g., to a manager, for example, using display 142. It is noted that embodiments of the invention may be used as an alternative to and/or in addition to other software methods and hardware methods of implementing data loss prevention. Furthermore, embodiments of the invention may be utilized with any type of integrated circuit including the central processor 112 and/or the graphics processor 141 described above.

Figure 2:
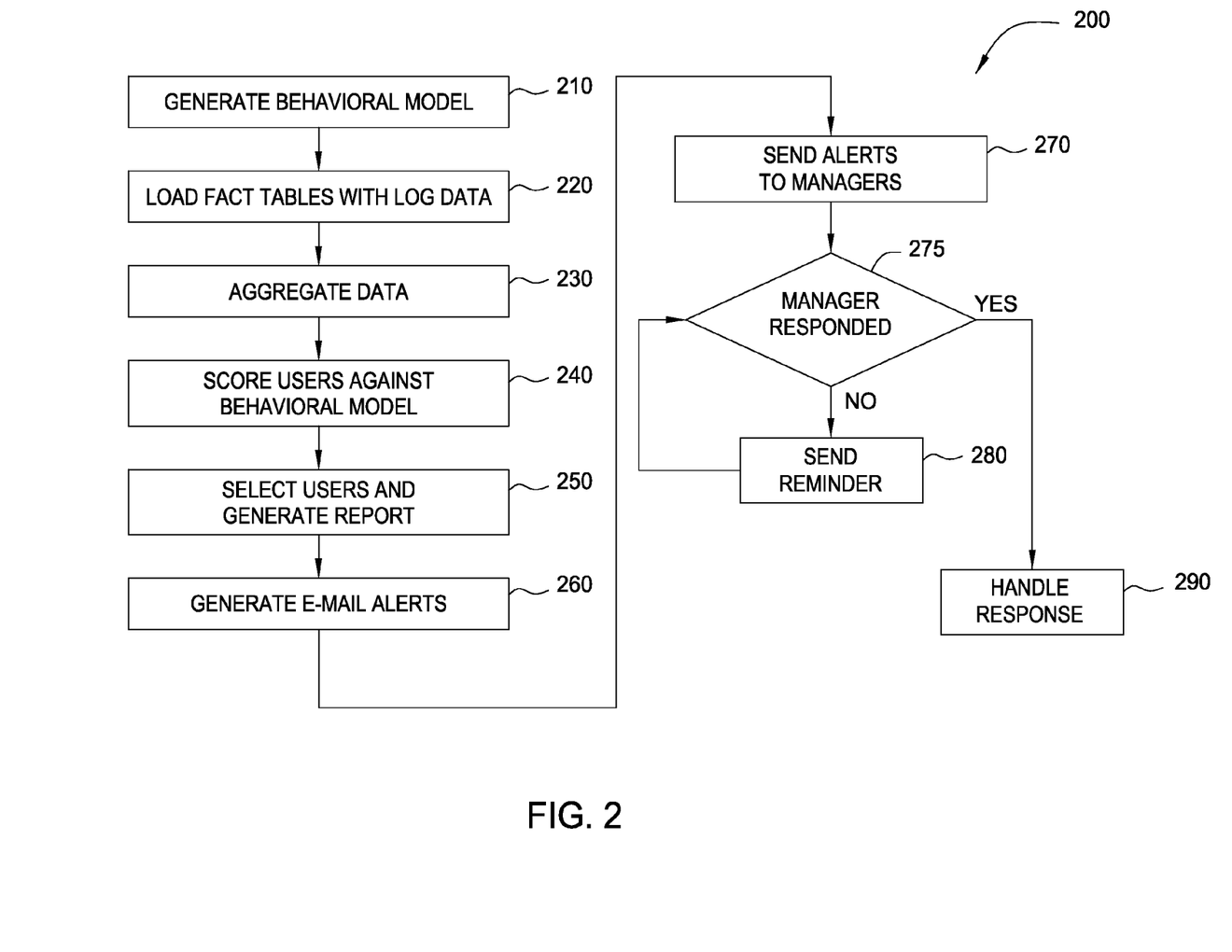
FIG. 2 is a block diagram illustrating a process for analyzing actions of authorized users to computer resources, according to one embodiment of the invention.

FIG. 2 is a block diagram illustrating a process 200 for analyzing actions of authorized users to computer resources, according to one embodiment of the invention. The method steps required for the overall operation of the computer system 100 including alert generation and handling are first briefly outlined below and then described in greater detail in FIGS. 3 through 9.

As shown, the process 200 begins at step 210, where one or more user behavioral models are generated. The behavioral models are adapted to characterize user behavior based on various user roles within an organization as well as user and group access patterns. For example, when the protected computer resources include computer source code, user roles may include different software development roles, such as a software developer, tester, or designer.

At step 220, data fact tables are loaded with log data generated by the SCM system in recent time periods. Logging of user actions to a log file for tracing the actions of users over time is one of the services routinely performed by SCM systems and is non-disruptive to business processes. Each log file contains information that may be analyzed to evaluate user behavior in recent time periods and detect changes in the behavior compared to past time periods (or relative to similar users). The information stored in the log files typically includes time stamps, user identifiers, action codes, and additional data that may depend on a particular action. For example, a file checkout log may also contain the filename of the file that was reserved by the user.

At step 230, individual transaction log data is aggregated or summarized in various ways as required for the analysis by the behavioral models generated at step 210. For example, while log records represent discrete actions taken by individual users at a single point in time, the behavioral model may require those actions to be aggregated by hour, day, week(s), or month(s). Once aggregated, this sum may be used as is or divided by the appropriate value to compute an average value over the specified time period. In a similar manner, log records may be aggregated over multiple individuals and time periods when the log records represent a group of users and their group behavior. For some behavior models, the data is aggregated based on user session intervals (actions taken after a user login and before a user logout).

At step 240, for each user (or group of users), log data from the current time period is scored against the behavioral models and business rule logic. The behavioral models enable deviation detection by evaluating user access log data and creating total user population profiles and individual user behavior profiles. Using the behavioral models, one or more aspects of user behavior may be analyzed to provide scalar values of positive or negative evidence of the specific user access patterns or behavior. The business rule logic or other decision logic are used to combine the output of the deviation detection techniques and render a decision whether to select a user for follow up reporting. In one embodiment, performing step 240 results in a collection of numeric measures (e.g., scalar values or Boolean indicators) representing a determined measure of the deviation of user behavior in the current time period from the behavior observed in the past, and indicating a specific measure of risk associated with the user due to the changed behavior.

At step 250, based on the results of the scoring process in step 240, a subset of the total user population is selected for reporting and a set of customized management reports are generated. The management reports display the user behavior over the current and recent past time periods.

At step 260, customized e-mail alert messages addressed to the managers of the selected users are generated. The e-mail alerts may include a URL link to the customized reports generated in step 250. The link allows the managers to investigate the user actions and determine whether they fall under normal business needs. Of course, in various embodiments, other techniques may be used.

At step 270, the e-mail alerts are sent to the appropriate managers. After a specified time interval has passed, at step 275, for each e-mail alert, the status of the alert is tested to determine whether a manager has responded to the alert. If, in step 275, it is determined that the manager has not yet submitted a response to the e-mail alert, then, in step 280, a reminder e-mail alert is generated and sent to the manager. The method then returns to step 275, described above. If, however, in step 275, it is determined that the manager has viewed the reports generated in step 250 and submitted a response to the e-mail alert, then the process 200 ends at step 290, where the response is handled. Manager's response may subsequently be used to adapt the system for future alerts (e.g., to prevent duplicate alerts) or to temporarily suspend alerts if the user behavior is due to a role change.

Figure 3:
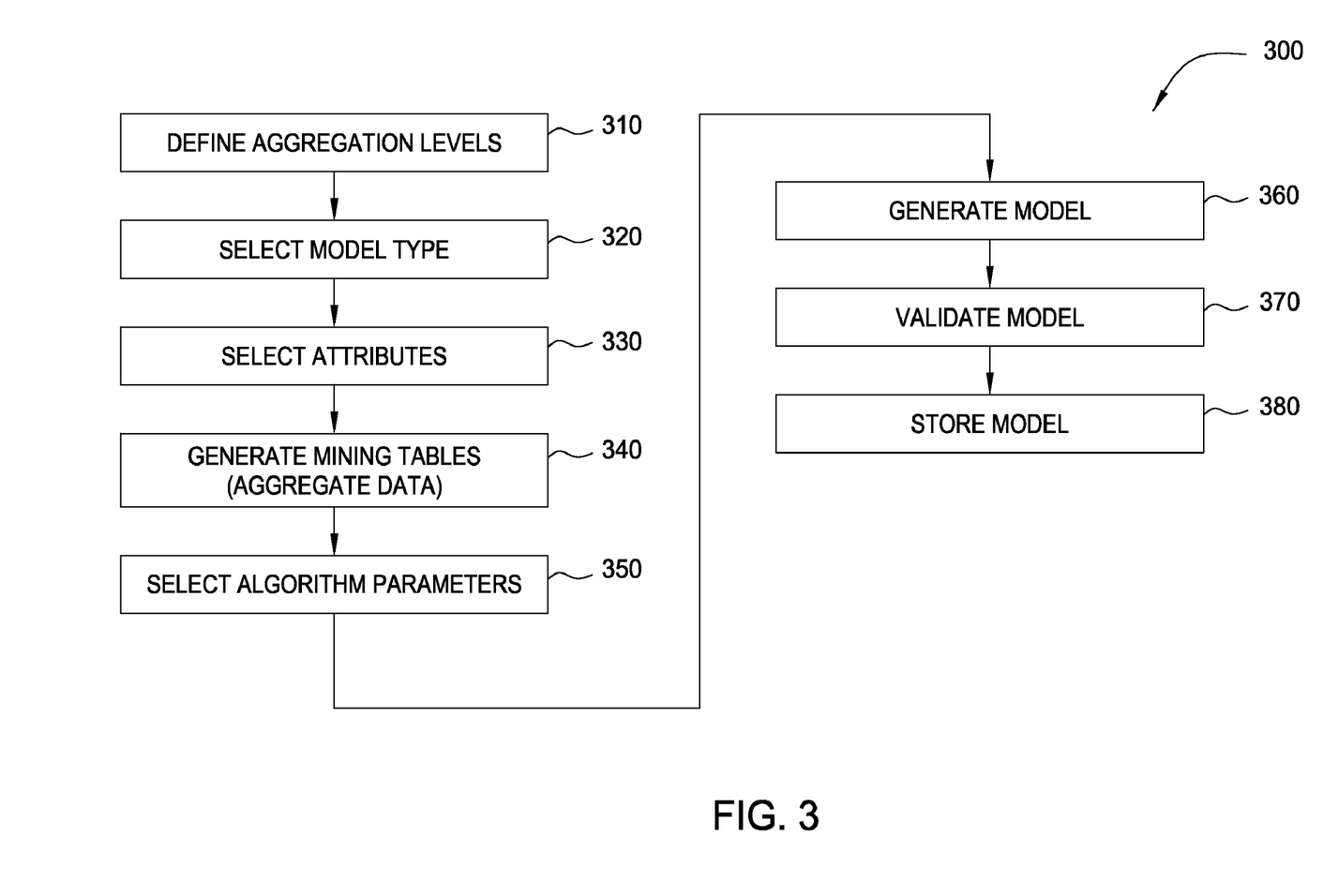
FIG. 3 is a block diagram illustrating a process of creating a user behavioral model, according to one embodiment of the invention.

Referring back now to step 210 where behavioral models are generated, FIG. 3 is a block diagram illustrating a process 300 of creating a user behavioral model, according to one embodiment of the invention. The creation of the user behavioral model is performed before the monitoring system can become operational. In one embodiment, the behavioral model may be built using SCM system log data that are normally generated when users access computer resources. The process 300 assumes that log data generated by the SCM system for the past time periods has been parsed and the fact tables have been loaded with individual transaction data in a manner similar to step 220 of parsing and loading the log data for the current time periods described above.

As illustrated in FIG. 3, the process 300 begins at step 310, where individual transaction data is aggregated at various levels depending on the data type and processing requirements. For example, user actions may be aggregated into hourly totals, while other parameters such as number of daily logins or total number of files checked out may be aggregated in weekly or monthly totals. At step 320, the type of a model to create and use for characterizing user behavior is selected, where model type is one of a number of classification, clustering, or association rule models well known to those skilled in the art of data mining and business intelligence. In one embodiment, a distribution-based (demographic) clustering model, a center- or kernel-based clustering model such as a neural network Kohonen map cluster model, or an association rule model may be selected. Persons skilled in the art will recognize that, in various embodiments, other data mining or statistical models could also be used to characterize user behavior. As step 330, specific attributes of data (i.e., fields of data) from the log records and action types are selected. The selected attributes may be used as inputs to the model selected in step 320.

At step 340, the selected attributes are aggregated into mining tables according to the aggregation levels specified in step 310. At step 350, model training parameters or control parameters (referred to herein as "algorithm parameters") are selected for the model type specified in step 320. In various embodiments, the algorithm parameters may include learning rate, numbers of clusters, and/or similarity measures. At step 360, a behavioral model is generated by running the selected model building or training algorithms using the aggregated data from step 340 and the algorithm parameters specified in step 350. At step 370, a system analyst may inspect and validate the behavioral model and statistical analysis of the predictive and generalization capabilities of the model. In one embodiment, step 370 may be implemented as a test procedure used to ensure that the model effectively captures aspects of user behavior required to achieve adequate detection of any deviations from the expected behavior. One example output of such a test procedure is to label the clusters in a demographic or Kohonen cluster model according to perceived user role in the development team. For example, a user could be identified as a manager, architect, developer, tester, casual user, etc. At step 380, the validated model is stored in the computer system 100.

In one embodiment, the process 300 may be performed several times to create multiple behavioral models. Alternatively, several model types may be selected at one time in step 320 described above. In such a case, steps 330 through 380 are carried out simultaneously for each of the selected model types.

Figure 4:
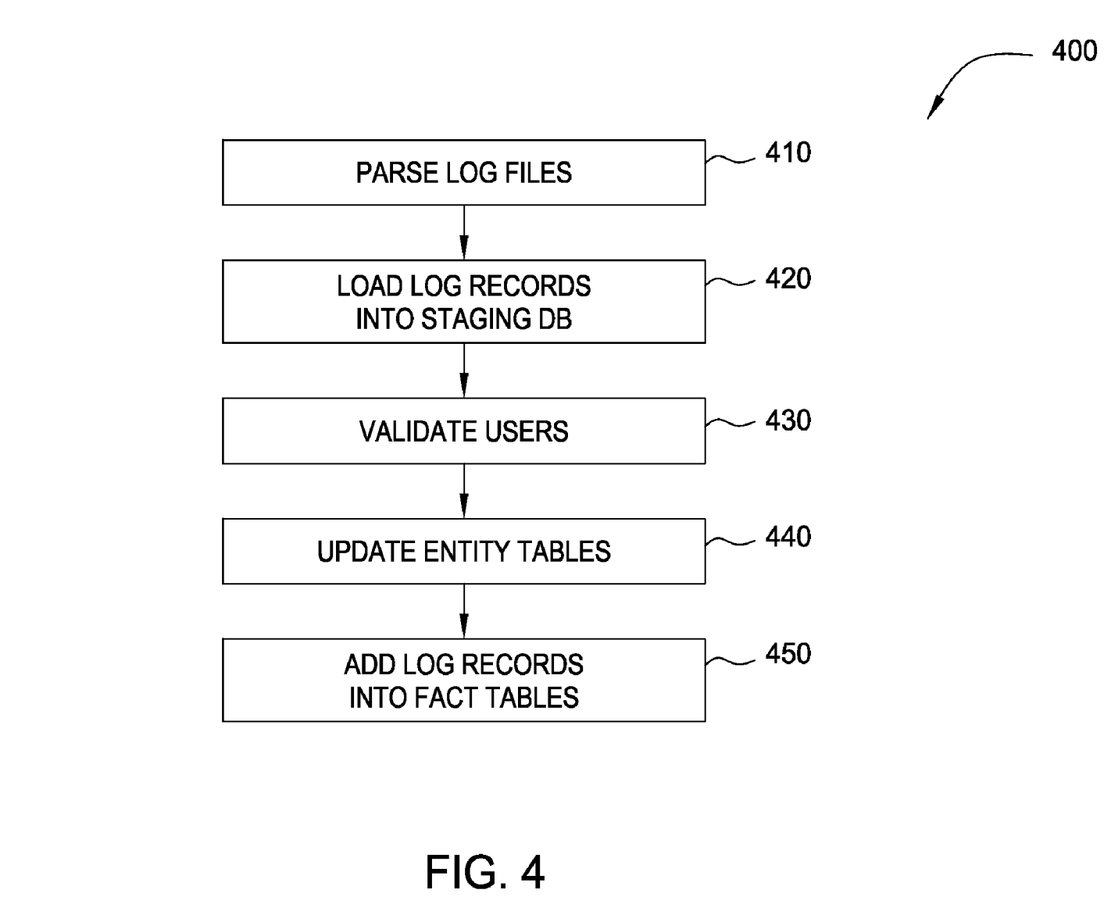
FIG. 4 is a block diagram illustrating a process of loading fact tables, according to one embodiment of the invention.

FIG. 4 is a block diagram illustrating a process 400 of loading fact tables, according to one embodiment of the invention. Process 400 may be performed as part of step 220 of the method of FIG. 2. As shown, process 400 begins at step 410, where log files generated by the SCM system are normalized, parsed and loaded into a database. Many SCM systems are available in the market and those skilled in the art will recognize that some may produce plain text log files while others may produce database log files. However, in either case, the SCM log files may be normalized and loaded into the system database. Therefore, at step 420, the normalized log records are loaded into a system staging database. At step 430, SCM user identifiers associated with the log records are validated against the company employee records to ensure that the users are currently employed by the company. Furthermore, validating the SCM user identifiers allows obtaining additional demographic and contact information for the users and the users' managers. The additional information may also include work location and organization information that may be used to determine the time zone and other related information about the users. Upon validation in step 430, the system staging database may be updated with such additional user, product, and other related information. At step 440, the validated new user and product data, and transaction log records are moved from the system staging database to the entity tables in the system data warehouse. The process 400 ends at step 450, where the log records are loaded into the fact tables that are used as the basis for data aggregation for model building and scoring procedures.

Figure 5:
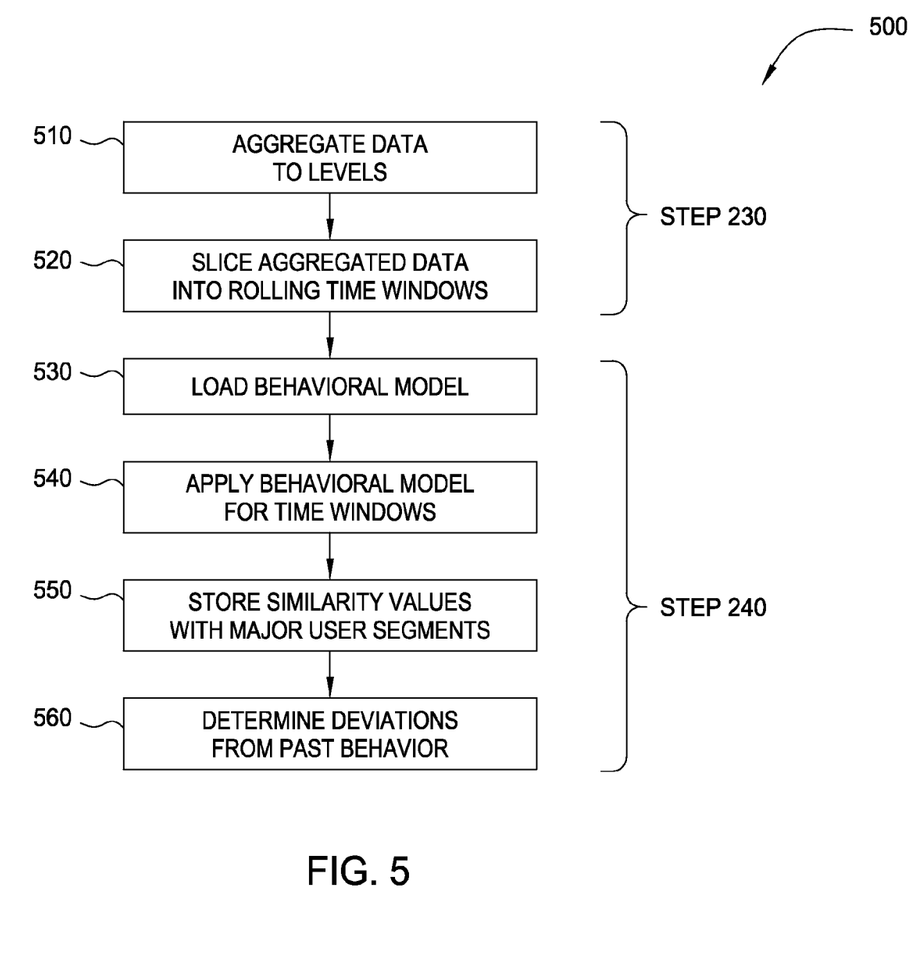
FIG. 5 is a block diagram illustrating a process of aggregating data and scoring users against the behavioral model, according to one embodiment of the invention.

FIG. 5 is a block diagram illustrating a process 500 of aggregating data and scoring users against the behavioral model, according to one embodiment of the invention. Process 500 may be performed as part of steps 230 and 240 of the method of FIG. 2. As shown, process 500 begins at step 510, where individual transaction log records are aggregated as required for the selected user behavioral model. At step 520, the aggregated data is sliced into time periods using a rolling time window as required by the behavioral models and specified by the system operator. In one embodiment, the rolling time window periods may be 2 weeks, and the current and past behavior periods may be 3 months and 6 months, respectively. Persons skilled in the art of data mining model building and usage will recognize that many factors are typically evaluated to select these time periods, and that, in different embodiments, other time periods may be appropriate based on the amount of data and the nature of the underlying software development process driving the changes. At step 530, the selected user behavioral model stored in step 380 described in FIG. 3 is loaded.

At step 540, the behavioral model is applied to the sliced aggregated data generated in step 520 to "score" or evaluate the series of actions taken by the users to detect whether the actions are consistent with or deviate from the expected actions based on the past behavior exhibited by the users and groups. In one embodiment, quantitative clustering approach based on the activity frequency and association rules may be employed to score users. In other embodiments, users may be scored by employing qualitative clustering which considers the type of activities performed by each user, but not the frequency of the activities. Of course, in various embodiments, other techniques may be used.

Figure 6A:
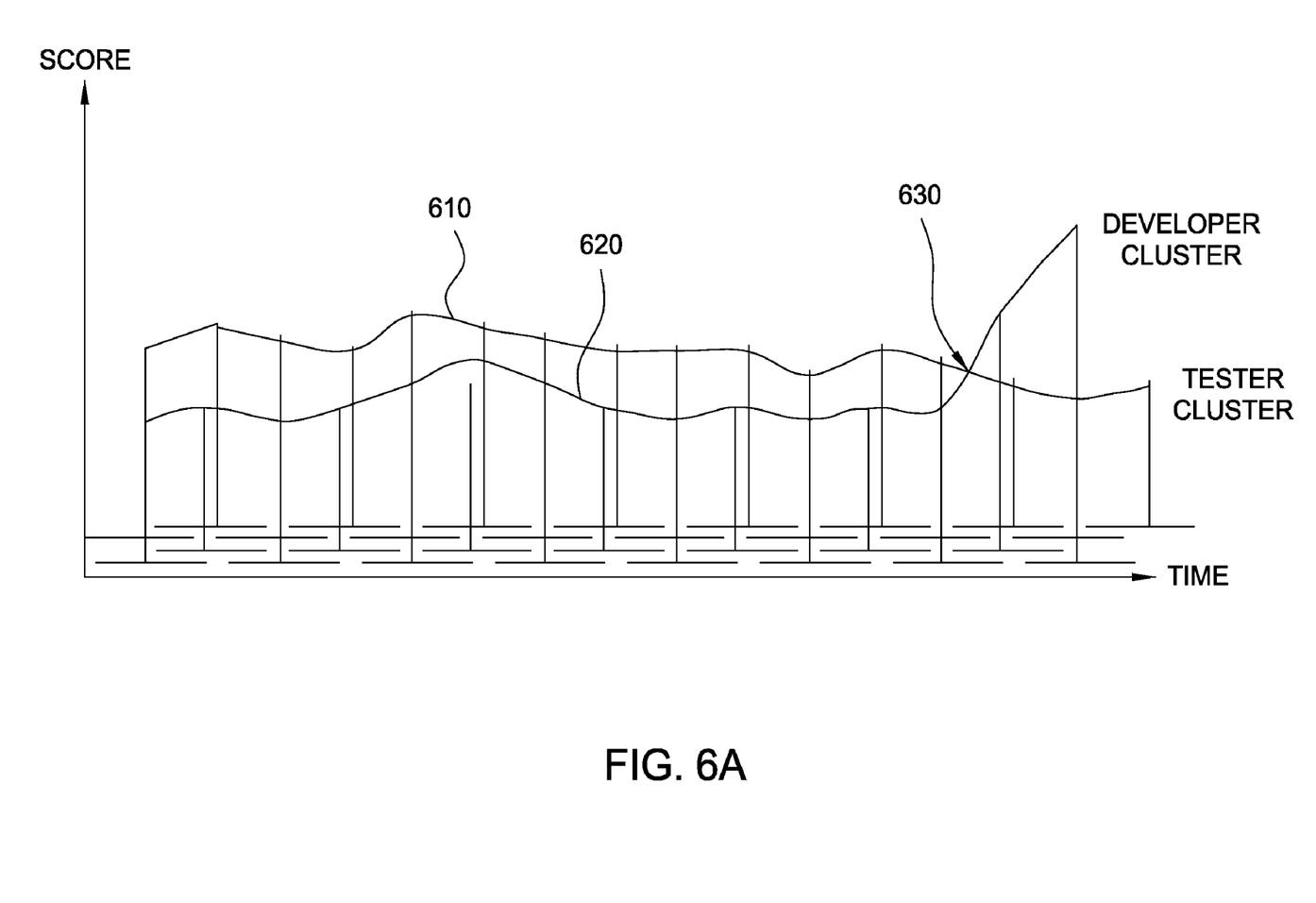
FIG. 6A is a conceptual illustration of analyzing the aggregate data to determine which user's behavior deviates from the behavioral model, according to one embodiment of the invention.
Figure 6B:
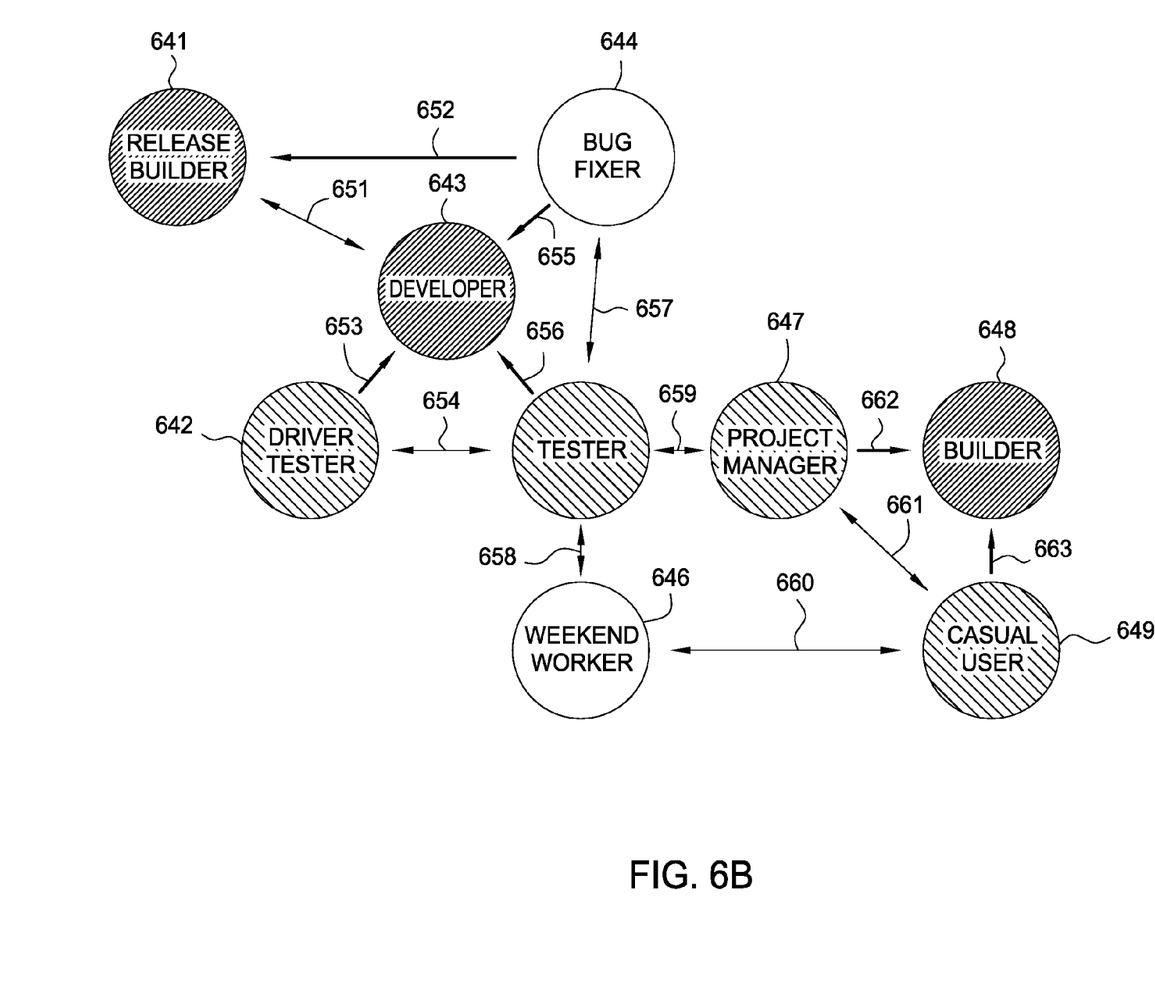
FIG. 6B is a conceptual illustration of analyzing the aggregate data to determine which user's behavior deviates from the behavioral model, according to another embodiment of the invention.

One example of qualitative clustering is Dynamic Time Frame Scoring (DTFS) approach based on a sliding window technique. The DTFS approach determines the time frame windows dynamically, based on the data nature, and score user data against all available clusters for user behavior pattern change detection. When employing a DTFS approach, there are several guidelines that should be followed. One guideline is that a collection of data is aggregated in a specific time frame for scoring against both quantitative and qualitative cluster models to profile a user behavior pattern. A second guideline is that time frame can be dynamically changed according to the nature of data and the evaluation of the user data scoring results. A third guideline is that time frames are overlapped so that abnormal user behaviors can be quickly detected by the scoring process. A fourth guideline is that the scores against all clusters for all time frames are used for the evaluation of user behavior changes. In essence, the cluster scores are used as feature detectors in the decision scoring model. A fifth guideline is that the lines crossing different clusters may indicate user profile switching, which is usually caused by significant user behavior changes and arises when a user switches from one role to another. For example, user profile switching may indicate that a user switched from a role of a developer to the role of a tester. FIGS. 6A and 6B illustrate in greater detail how data may be analyzed and interpreted using DTFS.

At step 550, as a result of applying behavioral models to the sliced aggregated data, similarity values with major user segments are generated and stored. In one embodiment, similarity values may include raw scalar and/or Boolean values. At step 560, the results from the scoring done in step 540 are analyzed to determine which user's behavior has changed or deviated from their past behavior (as represented by the behavioral models).

FIG. 6A is a conceptual illustration of analyzing the aggregate data to determine which user's behavior deviates from the behavioral model according to one embodiment of the invention. As previously described, when user behavioral models are created, users may be identified as, for example, managers, architects, developers or testers (or other labels as appropriate for a given case). Based on the identification, the user population may then be clustered to create, e.g., a manager cluster, an architect cluster, a developer cluster, and a tester cluster. As shown in FIG. 6A, line 610 illustrates how behavior of a tester cluster evolves over time. Similarly, line 620 illustrates how behavior of a developer cluster evolves over time. A point 630 indicates that user action pattern profile has changed. As previously described, user profile switching is usually caused by significant user behavior changes. In the case illustrated in FIG. 6A, the profile switched from a tester to a developer.

An alternative interpretation of the qualitative cluster model is shown in FIG. 6B. Specifically, FIG. 6B is a conceptual illustration of analyzing aggregate data to determine which user's behavior deviates from the behavioral model according to another embodiment of the invention. As shown, the user population data is clustered into a release builder cluster 641, a driver tester cluster 642, a developer cluster 643, a bug fixer cluster 644, a tester cluster 645, a weekend worker cluster 646, a project manager cluster 647, a builder cluster 648, and a casual user cluster 649. Of course, as above, the actual labels used to define clusters may be tailored to suit the needs of any individual case. The clusters 641-649 are then characterized as low, medium, or high risk depending on the number of file accesses associated with users who fall into those clusters. In FIG. 6B, the clusters marked with large-scale cross-hatching illustrate clusters characterized by low number of file accesses (i.e., the clusters 642, 645, 647, and 649). The clusters marked with small-scale cross-hatching illustrate clusters characterized by high number of file accesses (i.e., the clusters 641, 643, and 648). Finally, the clusters not marked with any cross-hatching illustrate clusters characterized by medium number of file accesses (i.e., the clusters 644 and 646).

After performing time-series analysis using DTFS, the movement of users between these clusters may be established, which is illustrated in FIG. 6B with arrows 651-663. As previously described, movement of users between clusters indicated changed behaviors. However, only certain transitions should trigger e-mail alerts. For example, one indicator of high risk of source code misappropriation could be movement from a low access cluster into a high access cluster (i.e.

transitions indicated with the arrows 653, 656, 662, and 663) because such transitions indicate a major increase in the number of file accesses by a user.

Figure 7:
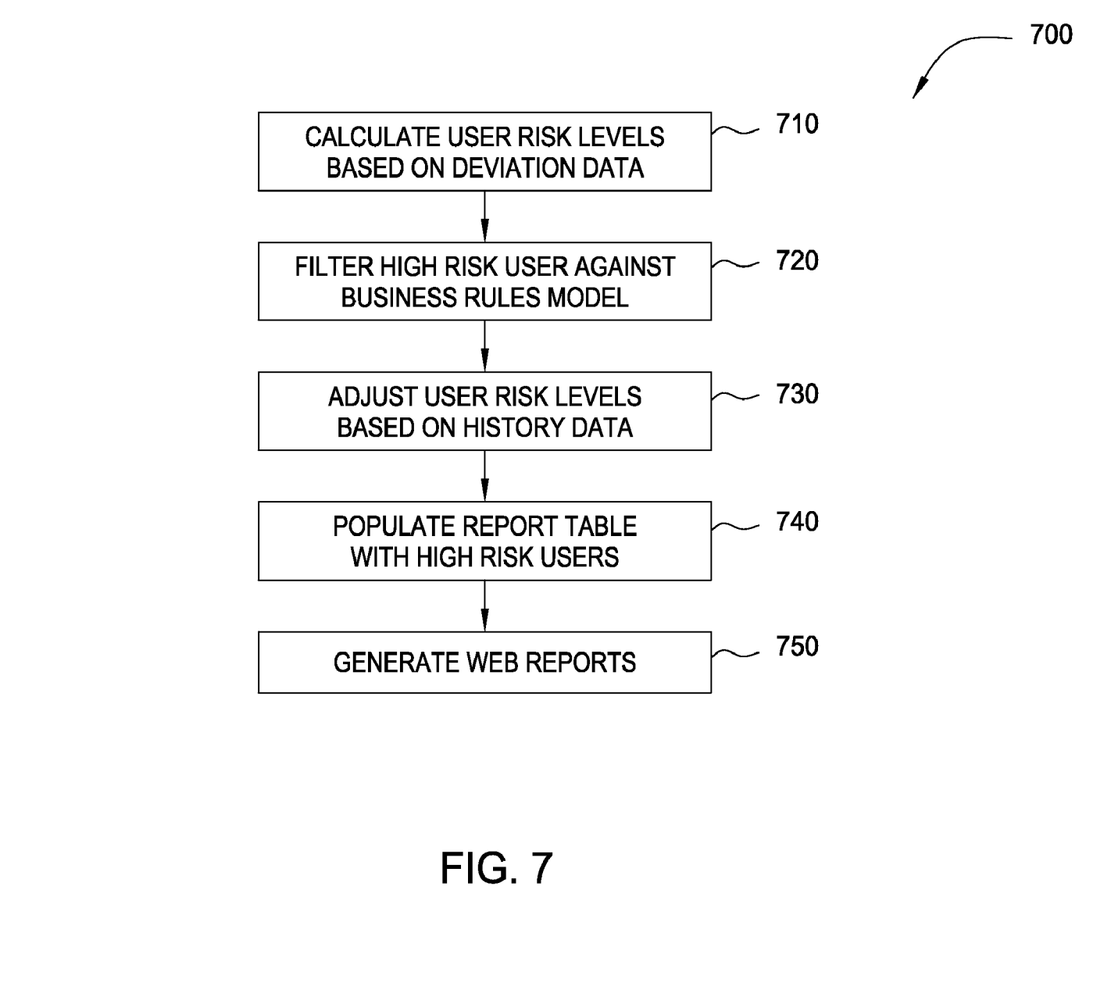
FIG. 7 is a block diagram illustrating a process of selecting users and generating reports, according to one embodiment of the invention.

FIG. 7 is a block diagram illustrating a process 700 of selecting users and generating reports, according to one embodiment of the invention. Process 700 may be performed as part of step 250 of the method of FIG. 2. The process 700 begins at step 710, where deviation data obtained from the model scoring process is analyzed to calculate user risk levels as, for example, described in FIG. 6B. At step 720, the users with the highest risk based on the behavioral model results are filtered using additional business rule logic. Step 720 may be used to introduce specific logical tests based on business rules within a given organization to identify behavior changes that may represent behavior that increases the risk of intellectual property/data loss. The business rules may utilize well known machine reasoning or inference techniques such as forward chaining, backward chaining, with or without backtracking. Those skilled in the art will recognize that a wide range of rule-based heuristics could be applied to the integration of the one or more behavior models at this step. At step 730, the risk levels of users are adjusted based on history data. For example, if an e-mail alert was generated for the user in the very recent past, then the history data may indicate that generating a new alert message would represent a duplicate alert which was already reported to and investigated by the user's manager. In such a case, the system may choose to not identify this user as a high-risk user a second time. At step 740, a report table is populated with the remaining high risk users. In one embodiment, populating the report table includes selecting users associated with the high-risk levels for e-mail alerts, as well as formatting and aggregating the raw transaction log data corresponding to such users in the report table. The process 700 ends at step 750, where the data in the report table is used to generate a set of customized reports. In one embodiment, the reports may comprise web reports using HTML, Java Server Pages (JSP), and IBM Alphablox reporting tools. Persons skilled in the art will recognize that many alternate tools could be used to format, generate, and display the report data to managers via the web and further other techniques.

Figure 8:
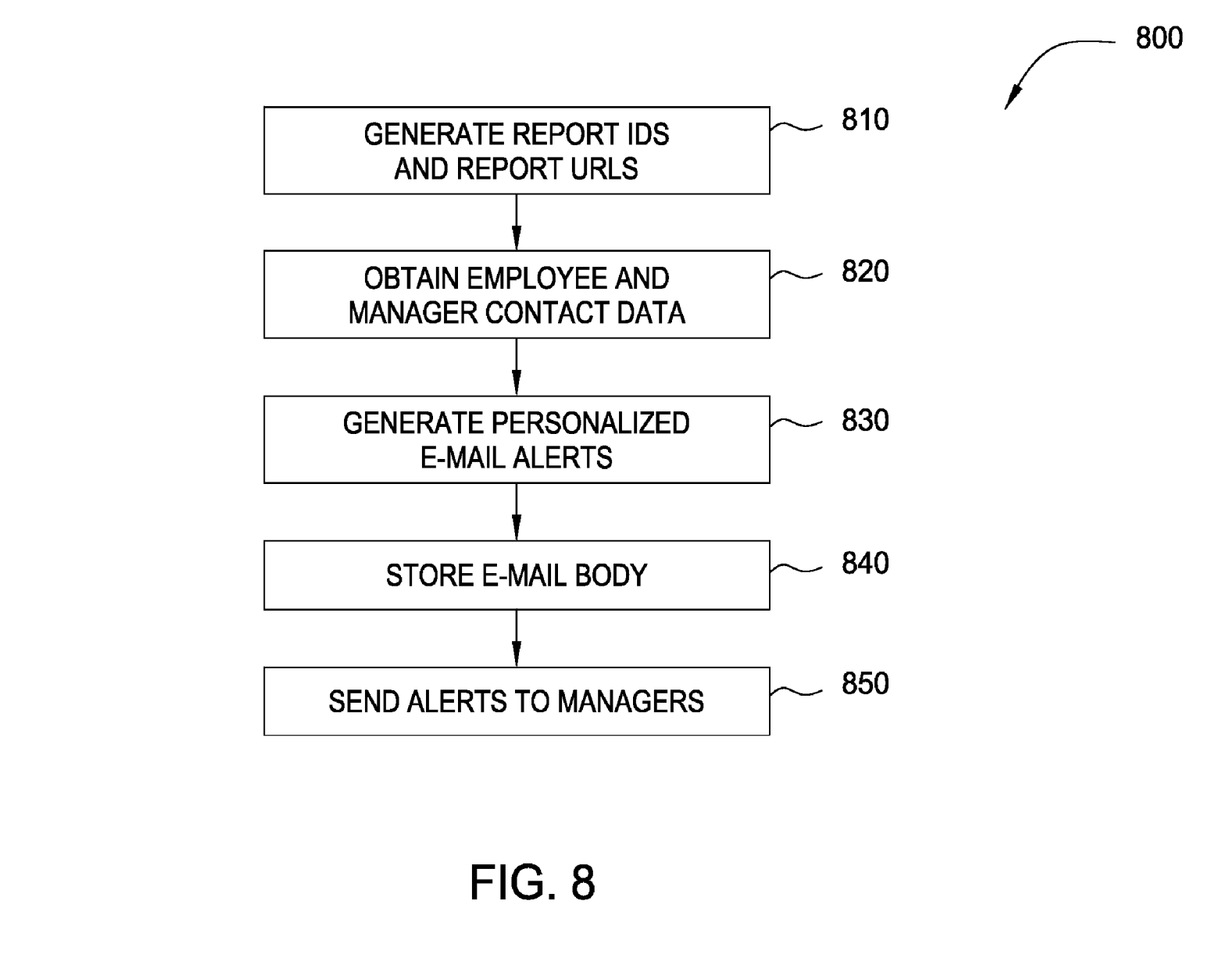
FIG. 8 is a block diagram illustrating a process of generating email alerts, according to one embodiment of the invention.

FIG. 8 is a block diagram illustrating a process 800 of generating e-mail alerts, according to one embodiment of the invention. Process 800 may be performed as part of step 260 of the method of FIG. 2. As shown, process 800 begins a step 810, where unique report identifiers (IDs) and associated report Universal Resource Locators (URLs) are created for each report detailing a user deemed problematic or otherwise suspicious by the system. At step 820, names and contact information including email address for the user and the user's manager are looked up in the system database. At step 830, the information obtained in step 820 is used to create customized e-mail alerts, addressed to the manager. Each e-mail alert may include the user's name and a link to the URL containing the customized web reports which allows the manager to investigate the user actions and determine whether they fall under normal business needs. In one embodiment, only the user's first line manager receives the e-mail alert and knows the URL of the associated report. In other embodiments, additional managers may also receive the e-mail alerts and review the associated reports. At step 840, the customized e-mail alert is stored in the system database for use in subsequent alert mailings and reminders. Further, who receives an alert may be tailored to suit the needs of a particular case. The process 800 ends at step 850, where the e-mail alert is sent to the manager.

Figure 9:
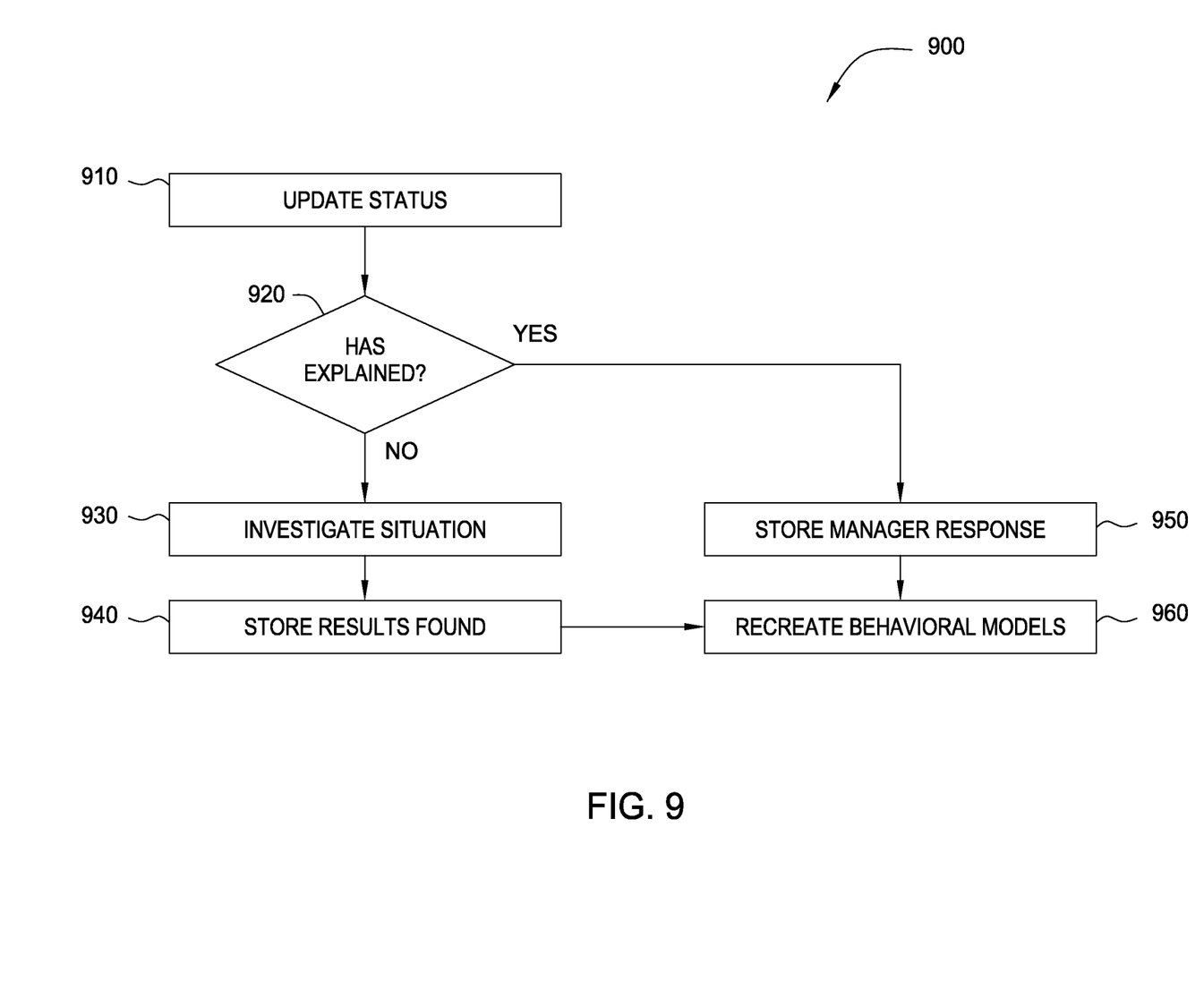
FIG. 9 is a block diagram illustrating a process of handling responses to the email alerts, according to one embodiment of the invention.

FIG. 9 is a block diagram illustrating a process 900 of managing responses to the e-mail alerts, according to one embodiment of the invention. As shown, process 900 begins at step 910, where an alert status is updated when the manager submits a response to the e-mail alert via the customized web report site. The response may include one of a set of predefined response code and optional comment fields. If no response is required from the manager, the status field is set to CLOSED and the alert is no longer active. If the response code indicates that some action is required, then the record is moved to the ACTIONS table and corrective actions are taken. At step 920, it is determined whether the manager has explained the detected deviation in user's behavior. If so, the method proceeds to step 950, where the manager's response is stored in the system database. The method then proceeds to step 960, where the user behavioral models are updated or retrained based on the manager's response. If, however, in step 920, it is determined that the manager has not explained the detected deviation in user's behavior, then at step 930, the situation is investigated to determine potential causes of the user's unusual behavior. At step 940, results of the investigation carried out in step 930 are stored in the system database. The method then proceeds to step 960, described above. By implementing a feedback to recreating behavioral models, the models may be adapted to improve the scoring process over time and avoid generation of unnecessary alerts.

By implementing embodiments of the present invention, investigation of user actions regarding computer resources is facilitated, while causing minimal amount of disruption to the ongoing software development processes. In addition, abrupt changes in behavior that may indicate use of an account by another user (i.e. a stolen password) may be detected. As a result, a data loss prevention method is available that is more effective relative to the prior art approaches.

While the foregoing is directed to embodiments of the present invention, other and further embodiments of the invention may be devised without departing from the basic scope thereof, and the scope thereof is determined by the claims that follow.

What is claimed is:

1. A computer-implemented method to model user access to computer resources, the method comprising:

collecting a first set of log records documenting user actions in accessing the computer resources during a first time interval;

aggregating the first set of log records at one or more chronological levels;

generating, by operation of one or more computer processors, a model of user behavior by running one or more selected model types using data associated with one or more attributes selected from the first set of log records, wherein the data is aggregated into one or more mining tables according to the one or more chronological levels, and further using at least one algorithm parameter selected for the one or more model types, wherein the generated model includes a plurality of clusters of the selected one or more model types, wherein each cluster is associated with a distinct, respective authorized user role that is authorized to access the computer resources, wherein each cluster characterizes a distinct, legitimate pattern with which any user of the respective authorized user role is expected to access the computer resources, wherein the generated model comprises at least one of a classification model, a clustering model, and an association rule model, wherein the clustering model comprises at least one of a distribution-based clustering model and a center-based clustering model; and scoring, based on the generated model and at least one scoring rule, a set of user actions to determine whether the set of actions is suspect, wherein the at least one scoring rule comprises at least one of a first scoring rule specifying to score the user against the plurality of clusters, a second scoring rule specifying to adjust one or more chronological levels at which the set of actions is aggregated, and a third scoring rule specifying that the one or more chronological levels at which the set of actions is aggregated include a plurality of overlapping time frames;

wherein the set of actions is determined to be suspect based on at least one of: (i) the set of user actions being classified by the generated model as characterizing a first authorized user role at a first point in time and characterizing a second authorized user role at a second point in time subsequent to the first point in time, wherein the second authorized user role is different from the first authorized user role; (ii) a resource access frequency monitored for the second authorized user role exceeding the resource access frequency monitored for the first authorized user role by at least a predetermined, user-specified amount, and wherein the resource access frequency characterizes a frequency of accessing one or more computer resources; and (iii) the set of actions satisfying one or more inference rules for identifying user behavior likely to cause data loss.

2. The method of claim 1, wherein each record in the first set of log records includes a user identification (ID) indicating that the record is associated with actions of the user.

3. The method of claim 2, wherein each record in the first set of log records is assigned to one of the clusters.

4. The method of claim 1, wherein the one or more model types comprise a distribution-based clustering model, a center-based clustering model, and/or an association rule model.

5. The method of claim 1, wherein the at least one algorithm parameter comprises at least one of learning rate, number of clusters, and similarity measure.

6. The method of claim 1, wherein generating the model of user behavior further comprises performing a test procedure to validate the model of user behavior.

7. The method of claim 6, wherein the test procedure comprises performing statistical analysis of predictive and generalization capabilities of the model of user behavior.

8. The method of claim 1, wherein the computer resources comprise computer source code.

9. A computer-readable storage medium storing a computer program which, when executed by a processor, performs an operation to model user access to computer resources, the operation comprising:

collecting a first set of log records documenting user actions in accessing the computer resources during a first time interval;

aggregating the first set of log records at one or more chronological levels;

selecting one or more model types; and generating, by operation of one or more computer processors when executing the computer program, the model of user behavior by running one or more selected model types using data associated with one or more attributes selected from the first set of log records, wherein the data is aggregated into one or more mining tables according to the one or more chronological levels, and further using at least one algorithm parameter selected for the one or more model types, wherein the generated model includes a plurality of clusters of the selected one or more model types, wherein each cluster is associated with a distinct, respective authorized user role that is authorized to access the computer resources, wherein each cluster characterizes a distinct, legitimate pattern with which any user of the respective authorized user role is expected to access the computer resources, wherein the generated model comprises at least one of a classification model, a clustering model, and an association rule model, wherein the clustering model comprises at least one of a distribution-based clustering model and a center-based clustering model; and scoring, based on the generated model and at least one scoring rule, a set of user actions to determine whether the set of actions is suspect, wherein the at least one scoring rule comprises at least one of a first scoring rule specifying to score the user against the plurality of clusters, a second scoring rule specifying to adjust one or more chronological levels at which the set of actions is aggregated, and a third scoring rule specifying that the one or more chronological levels at which the set of actions is aggregated include a plurality of overlapping time frames;

wherein the set of actions is determined to be suspect based on at least one of: (i) the set of user actions being classified by the generated model as characterizing a first authorized user role at a first point in time and characterizing a second authorized user role at a second point in time subsequent to the first point in time, wherein the second authorized user role is different from the first authorized user role; (ii) a resource access frequency monitored for the second authorized user role exceeding the resource access frequency monitored for the first authorized user role by at least a predetermined, user-specified amount, and wherein the resource access frequency characterizes a frequency of accessing one or more computer resources; and (iii) the set of actions satisfying one or more inference rules for identifying user behavior likely to cause data loss.

10. The computer-readable storage medium of claim 9, wherein each record in the first set of log records includes a user identification (ID) indicating that the record is associated with actions of the user.

11. The computer-readable storage medium of claim 10, wherein each record in the first set of log records is assigned to one of the clusters.

12. The computer-readable storage medium of claim 9, wherein the one or more model types comprise a distribution-based clustering model, a center-based clustering model, and/or an association rule model.

13. The computer-readable storage medium of claim 9, wherein the at least one algorithm parameter comprises at least one of learning rate, number of clusters, and similarity measure.

14. The computer-readable storage medium of claim 9, wherein generating the model of user behavior further comprises performing a test procedure to validate the model of user behavior.

15. The computer-readable storage medium of claim 14, wherein the test procedure comprises performing statistical analysis of predictive and generalization capabilities of the model of user behavior.

16. The computer-readable storage medium of claim 9, wherein the computer resources comprise computer source code.

17. A system, comprising:
a processor; and
a memory containing a program, which when executed by the processor is configured to perform an operation to model user access to computer resources, the operation comprising:

collecting a first set of log records documenting user actions in accessing the computer resources during a first time interval;

aggregating the first set of log records at one or more chronological levels;

generating a model of user behavior by running one or more selected model types using data associated with one or more attributes selected from the first set of log records, wherein the data is aggregated into one or more mining tables according to the one or more chronological levels, and further using at least one algorithm parameter selected for the one or more model types, wherein the generated model includes a plurality of clusters of the selected one or more model types, wherein each cluster is associated with a distinct, respective authorized user role that is authorized to access the computer resources, wherein each cluster characterizes a distinct, legitimate pattern with which any user of the respective authorized user role is expected to access the computer resources, wherein the generated model comprises at least one of a classification model, a clustering model, and an association rule model, wherein the clustering model comprises at least one of a distribution-based clustering model and a center-based clustering model; and scoring, based on the generated model and at least one scoring rule, a set of user actions to determine whether the set of actions is suspect, wherein the at least one scoring rule comprises at least one of a first scoring rule specifying to score the user against the plurality of clusters, a second scoring rule specifying to adjust one or more chronological levels at which the set of actions is aggregated, and a third scoring rule specifying that the one or more chronological levels at which the set of actions is aggregated include a plurality of overlapping time frames;

wherein the set of actions is determined to be suspect based on at least one of: (i) the set of user actions being classified by the generated model as characterizing a first authorized user role at a first point in time and characterizing a second authorized user role at a second point in time subsequent to the first point in time, wherein the second authorized user role is different from the first authorized user role; (ii) a resource access frequency monitored for the second authorized user role exceeding the resource access frequency monitored for the first authorized user role by at least a predetermined, user-specified amount, and wherein the resource access frequency characterizes a frequency of accessing one or more computer resources; and (iii) the set of actions satisfying one or more inference rules for identifying user behavior likely to cause data loss.

18. The system of claim 17, wherein each record in the first set of log records includes a user identification (ID) indicating that the record is associated with actions of the user.

19. The system of claim 18, each record in the first set of log records is assigned to one of the clusters.

20. The system of claim 17, wherein the one or more model types comprise a distribution-based clustering model, a center-based clustering model, and/or an association rule model.

21. The system of claim 17, wherein the at least one algorithm parameter comprises at least one of learning rate, number of clusters, and similarity measure.

22. The system of claim 17, wherein generating the model of user behavior further comprises performing a test procedure to validate the model of user behavior.

23. The system of claim 22, wherein the test procedure comprises performing statistical analysis of predictive and generalization capabilities of the model of user behavior.

24. The system of claim 17, wherein the computer resources comprise computer source code.

* * * * *